United States Patent
Zhao (10) Patent No.: US 12,120,648 B2
(45) Date of Patent: Oct. 15, 2024

(54) METHOD AND DEVICE FOR PROCESSING SIDELINK OPERATION

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 333 days.

(21) Appl. No.: 17/764,510

(22) PCT Filed: Sep. 29, 2019

(86) PCT No.: PCT/CN2019/109184
§ 371 (c)(1),
(2) Date: Mar. 28, 2022

(87) PCT Pub. No.: WO2021/056564
PCT Pub. Date: Apr. 1, 2021

(65) Prior Publication Data
US 2022/0400482 A1    Dec. 15, 2022

(51) Int. Cl.
*H04W 72/04* (2023.01)
*H04W 72/0446* (2023.01)
*H04W 92/18* (2009.01)

(52) U.S. Cl.
CPC ........ *H04W 72/0446* (2013.01); *H04W 92/18* (2013.01)

(58) Field of Classification Search
CPC .. H04W 72/0446; H04W 76/14; H04W 76/23
See application file for complete search history.

(56) References Cited

FOREIGN PATENT DOCUMENTS

| WO | WO 2017035305 A1 | 3/2017 |
|----|------------------|--------|
| WO | WO 2018004323 A1 | 1/2018 |

OTHER PUBLICATIONS

Huawei et al. "Frame and slot structure for sidelink", 3GPP TSG RAN WG1 Meeting #95, R1-1813552, Nov. 2018, pp. 1-4 (Year: 2018).*
Indian Patent Application No. 202247024782, Office Action dated Sep. 7, 2022, 5 pages.
European Patent Application No. 19947411.5, Search and Opinion dated Oct. 11, 2023, 29 pages.
Spreadtrum Communications; 3GPP TSG RAN WG1 Meeting #94bis, R1-1811010 "Discussion on sidelink physical layer structures and procedure(s)" Oct. 2018, 7 pages.
Vivo; 3GPP TSG RAN WG1 #96; R1-1904073 "Discussion on mode 1 resource allocation mechanism" Apr. 2019; 9 pages.

(Continued)

*Primary Examiner* — Jamal Javaid
(74) *Attorney, Agent, or Firm* — Cozen O'Connor (57) ABSTRACT

A method for processing a sidelink communication operation in a wireless communication network includes: for a sidelink operation to be performed, obtaining symbol types of target symbols, the target symbols including time domain symbols where a sidelink resource used by the sidelink operation is located; and if the symbol types of the target symbols indicate that a flexible time domain symbol exists in the target symbols, processing the sidelink operation according to the sidelink operation and an uplink/downlink operation in the flexible time domain symbol.

18 Claims, 3 Drawing Sheets

(56) References Cited

OTHER PUBLICATIONS

Fujitsu; 3GPP TSG RAN WG1 #96bis; R-1901946 "Discussion on Basic Resource Allocation Methods for NR-V2X Sidelink Communication" Mar. 2019; 14 pages.
LG Electronics; 3GPP TSG RAN WG1 #97; R1-1907013 "Discussion on resource allocation for NR sidelink Mode 1"; May 2019; 5 pages.
LG Electronics; 3GPP TSG RAN WG1 #97 Meeting, R1-1907015 "Discussion on resource allocation for NR sidelink Mode 1" May 2019, 5 pages.
European Patent Application No. 19947411.5, partial Search and Opinion dated Jun. 13, 2023, 21 pages.
Huawei, et al. "Frame and slot structure for sidelink" 3GPP TSG RAN WG1 Meeting #95, R1-1813552, Nov. 2018, 4 pages.
LG Elecronics "Discussion on resource allocation for NR sidelink Mode 1" 3GPP TSG RAN WG1 #96bis, R1-1905438, Apr. 2019, 10 pages.
Vivo "Discussion on mode 1 resource allocation mechanism" 3GPP TSG RAN WG1 #98, R1-1908149, Aug. 2019, 15 pages.

\* cited by examiner

METHOD AND DEVICE FOR PROCESSING SIDELINK OPERATION

CROSS-REFERENCE TO RELATED APPLICATION

This application is the US national phase application of International Application No. PCT/CN2019/109184, filed on Sep. 29, 2019, the entire contents of which are incorporated herein by reference.

TECHNICAL FIELD

The disclosure relates to the field of wireless communication technology, in particular to a method and an apparatus for processing a sidelink operation, and a storage medium.

BACKGROUND

Sidelink technology is a near field communication technology in which terminals directly connect information through wireless interfaces between each other instead of going through a network.

In the related art, flexible time domain symbols in a cellular mobile communication network are generally 1) used for handover guard time between downlink and uplink operations, 2) used for non-cellular communication or 3) reserved for future resource usage. Sidelink operations are considered end-to-end direct data transmission based on a cellular network. At present, there is no solution in the industry for how to process a sidelink communication when the sidelink resources used for the sidelink and the flexible time domain symbols of the user equipment overlap in the time domain.

SUMMARY

According to a first aspect of embodiments of the present disclosure, a method for processing a sidelink operation is provided. The method is performed by a user equipment, and includes:

for a sidelink operation to be performed, obtaining symbol types of target symbols, wherein the target symbols include respective time domain symbols where a sidelink resource used by the sidelink operation is located;

in a case that the symbol types of the target symbols indicate that a flexible time domain symbol exists in the target symbol, processing the sidelink operation according to the sidelink operation and an uplink/downlink operation in the flexible time domain symbol.

According to a second aspect of embodiments of the present disclosure, an apparatus for processing a sidelink operation is provided. The apparatus is applied in a user equipment, and includes:

a processor;

a memory configured to store instructions executable by the processor;

wherein, the processor is configured to:

for a sidelink operation to be performed, obtain symbol types of target symbols, wherein the target symbols include respective time domain symbols where a sidelink resource used by the sidelink operation is located;

in a case that the symbol types of the target symbols indicate that a flexible time domain symbol exists in the target symbols, process the sidelink operation according to the sidelink operation and an uplink/downlink operation in the flexible time domain symbol.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Example embodiments will be explained in detail here, and examples are shown in the attached drawings. Where the following description relates to appended drawings, the same numbers in different appended drawings indicate the same or similar elements, unless otherwise indicated. Implementations described in the following example embodiments do not represent all implementations consistent with the present invention. Rather, they are merely examples of devices and methods which are consistent with some aspects of the invention as detailed in the attached claims.

It should be understood that reference herein to "several" refers to one or more, and "a plurality of" refers to two or more. "And/or", which describes the association relationship of the associated objects, means that there can be three kinds of relationships, for example, A and/or B, which can mean that A exists alone, A and B exist at the same time, and B exists alone. The character "/" generally indicates that the associated objects are in an "or" relationship.

The continuous emergence of a new generation of new Internet applications has put forward higher requirements for wireless communication technology, which drives the continuous evolution of wireless communication technology to meet the needs of applications. Internet of vehicles (IoV) communication is one of the applications that the development of cellular wireless communication networks needs to support.

Vehicle-to-everything (V2X) communication includes vehicle-to-vehicle (V2V) service, vehicle-to-infrastructure (V2I) service, and vehicle-to-pedestrian (V2P) service. By supporting communication between in-vehicle devices (V2V), between in-vehicle devices and roadside devices (V2I), and between in-vehicle devices and handheld devices (V2P), the Internet of Vehicles can effectively improve traffic safety, improve traffic efficiency and enrich people's travel experience. Using existing cellular communication technology to support IoV communication can effectively utilize existing base station deployment, reduce equipment overhead, and be more conducive to providing services with guaranteed quality of service (QoS) to meet the needs of IoV services. Therefore, in the Long Term Evolution (Long Term Evolution, LTE) Rel-14/15, the cellular network supports the V2x communication of the Internet of Vehicles, that is, C-V2x (cellular based V2x). In C-V2x, the communication between in-vehicle devices and other devices can be relayed through the base station and the core network, that is, using the communication link between the terminal equipment and the base station in the original cellular network for communication (uplink/downlink communication); or can be performed directly over sidelink between devices (sidelink communication). Compared with Uu interface communication, sidelink communication has the characteristics of short delay and low overhead, and is very suitable for direct communication between in-vehicle devices and other peripheral devices that are geographically close.

V2x sidelink communication in LTE can only support some basic security V2x applications, such as performing voice broadcast communication of Cooperative Awareness Message (CAM) or Decentralized Environmental Notification Message (DENM) and other basic security message (BSM). With the recent development of technologies such as autonomous driving, in order to support new V2x services, new requirements have been put forward for the performance of V2x technology. Using the 5th generation mobile communication (5G), also known as New Radio (NR) technology to support new V2x communication services and scenarios has been planned by 3GPP as an important part of Rel16. The 3GPP SA1 (Service Requirement) working group has established some new service requirements for V2x communication, including Vehicles Platooning, Extended Sensors, Advanced Driving, and remote driving. In general, NR V2x sidelink needs to provide a higher communication rate, a shorter communication delay, and a more reliable communication quality.

The concept of bandwidth part (BWP) is introduced in the NR uplink and downlink design. A BWP refers to a continuous frequency domain resource block (RB) at a given subcarrier interval on a given carrier frequency. In the NR uplink design, each user equipment can be configured with up to four uplink BWPs on a given carrier, but only one of them can be activated at the same time. The base station can activate and switch the BWP through downlink dynamic signaling.

In NR V2x Rel16, similar to the uplink BWP and the downlink BWP, the sidelink BWP used by the user equipment for sidelink transmission and reception is defined. In order to ensure that data can sent and received between the same arbitrary users, the same BWP is used to send and receive data on the sidelink. Each IoV user can only be configured with one sidelink BWP, and it is assumed that all IoV user equipments are configured with the same BWP. A sidelink resource pool is further specified on the sidelink BWP as a collection of time and frequency resources that can be used by sidelink.

Figure 1:
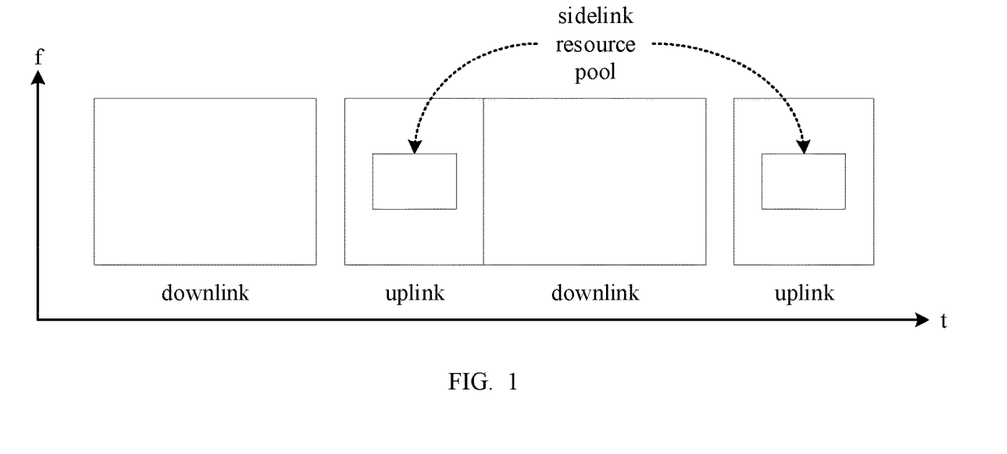
FIG. 1 is a schematic diagram of a resource pool configuration for sidelink in LTE according to an example embodiment.

In LTE V2x, only uplink time and frequency resources can be used for sidelink transmission. If it is a Time Division Duplexing (TDD) system, the time-frequency resources for sidelink are in the uplink subframe; if it is a Frequency Division Duplexing (FDD) system, the time-frequency resources for sidelink are in in the uplink frequency band. Please refer to FIG. 1, which shows a schematic diagram of a resource pool configuration for sidelink in LTE provided according to an example embodiment of the present disclosure.

In the NR TDD system, the allocation of uplink and downlink time resources is determined by the slot format. The slot format includes a downlink time domain symbol (DL symbol), an uplink time domain symbol (UL symbol) and a flexible time domain symbol.

The flexible time domain symbol is generally used for switching guard time between downlink and uplink, for non-cellular communication or is reserved for future resource use. It can also be converted into the uplink or downlink time domain symbol for uplink/downlink communication in certain cases. The system can configure the slot format through common (UE common) semi-static downlink signaling or user-specific (UE specific) semi-static downlink signaling. The flexible time domain symbols in the commonly configured slot format can be changed to uplink or downlink time domain symbols by user-specific configuration. The system can also indicate the flexible time domain symbols in the semi-statically configured slot format through downlink dynamic signaling, and change the flexible time domain symbols to uplink or downlink time domain symbols. For example, the 14 symbols in a certain slot in the semi-static common configuration are all flexible time domain symbols. These 14 symbols can be indicated as the format of DDXXXXXXXXXXXUU through a user-specific Radio Resource Control (RRC) signaling, and the downlink DCI signaling can re-indicate the 14 symbols as the format of DDXXUUUDDXXUUU. Here D is a downlink time domain symbol, U is an uplink time domain symbol, and X is a flexible time domain symbol.

Depending on the configuration mode of the flexible time domain symbols and the type and scheduling mode of the uplink and downlink transmission of the user equipment, when the uplink and downlink transmission and the transmission of the flexible time domain symbols overlap in the time domain, the user equipment has different processing modes. For example, for uplink and downlink transmissions that are semi-statically configured by high layers, the user equipment will give up transmission; while for uplink or downlink transmissions scheduled by DCI, the user will perform corresponding sending or receiving operations. For the blind detection operation of the Physical Downlink Control Channel, PDCCH, if the flexible time domain symbols are configured through semi-static downlink signaling, the user needs to perform the blind detection operation; and if the flexible time domain symbols are configured through DCI, the user does not perform the blind detection operation.

However, in the related art, there lacks a solution on how to use time-frequency resources on flexible time domain symbols for sidelink communication.

Various embodiments involved in the present disclosure show the solution of how to process the sidelink when the time domain symbols of the sidelink resource of the sidelink include flexible time domain symbols, so as to realize compatibility of the sidelink and the flexible time domain symbols.

Figure 2:
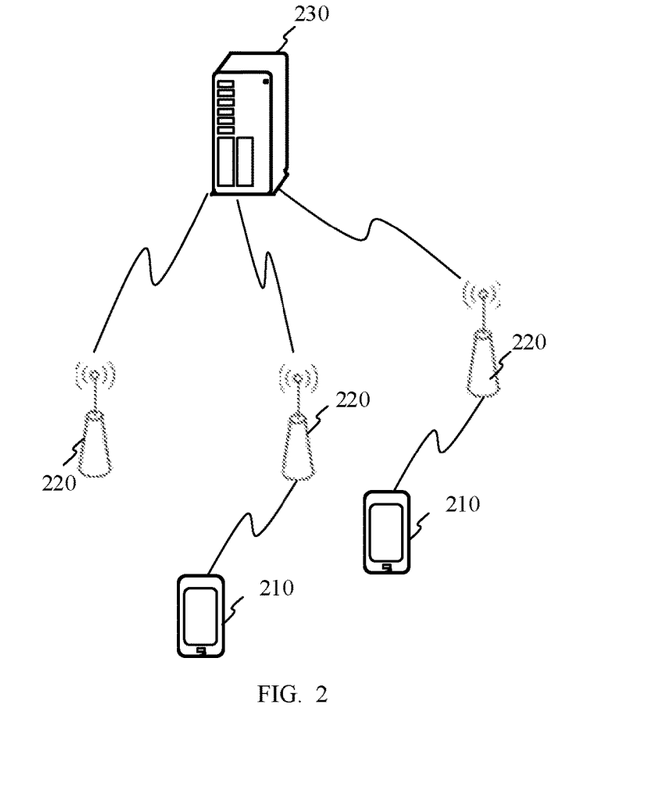
FIG. 2 is a schematic diagram of an implementation environment involved in a method for processing a sidelink operation according to an example embodiment.

FIG. 2 is a schematic diagram of an implementation environment involved in a method for processing a sidelink operation according to some example embodiments. As shown in FIG. 2, the implementation environment may include: several user equipment 210 and base stations 220.

The user equipment 210 is a wireless communication device that supports multiple radio access technologies for sidelink transmission. For example, the user equipment 210 may support cellular mobile communication technology, for example, may support the fifth generation mobile communication technology. Alternatively, the user equipment 210 may also support a next-generation mobile communication technology of 5G technology.

For example, the user equipment 210 may be an in-vehicle communication device, for example, a trip computer with a wireless communication function, or a wireless communication device connected to an external trip computer.

Alternatively, the user equipment 210 may also be a roadside device, for example, may be a street light, a signal light or other roadside device with a wireless communication function.

Alternatively, the user equipment 210 may also be a user terminal device, such as a mobile phone (or "cellular" phone) and a computer with a mobile terminal, for example, may be portable, pocket-sized, hand-held, computer-built, or vehicle-mounted mobile device. For example, Station (STA), subscriber unit, subscriber station, mobile station, mobile, remote station, access point, remote terminal, access terminal, user terminal, user agent, user equipment, or user equipment may be used. Specifically, for example, the user equipment 210 may be a mobile terminal such as a smart phone, a tablet computer, an e-book reader, or the like, or may be a smart wearable device such as smart glasses, a smart watch, or a smart bracelet.

The base station 220 may be a network-side device in a wireless communication system. The wireless communication system may also be a 5G system, also known as a new radio (NR) system. Alternatively, the wireless communication system may also be a next-generation system of the 5G system.

The base station 220 may be a base station (gNB) that adopts a centralized-distributed architecture in a 5G system. When the base station 220 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer, and the distributed unit is provided with a protocol stack of a Physical (PHY) layer. The specific implementation of the base station 120 is not limited in embodiments of the present disclosure.

A wireless connection may be established between the base station 220 and the user equipment 210 through a wireless air interface. The wireless air interface is a wireless air interface based on the fifth generation mobile communication network technology (5G) standard, for example, the wireless air interface is a new air interface; or, the wireless air interface may also be a wireless air interface based on a next-generation mobile communication network technology standard based on 5G.

Optionally, the above wireless communication system may further include a network management device 230.

Several base stations 220 are respectively connected to the network management device 230. The network management device 230 may be a core network device in a wireless communication system. For example, the network management device 230 may be a Mobility Management Entity (MME) in an Evolved Packet Core (EPC) network. Alternatively, the network management device may also be other core network devices, such as a serving gateway (SGW), a public data network gateway (PGW), a policy and charging rules functional (PCRF) unit or Home Subscriber Server (HSS), etc. The implementation of the network management device 230 is not limited in embodiments of the present disclosure.

Figure 3:
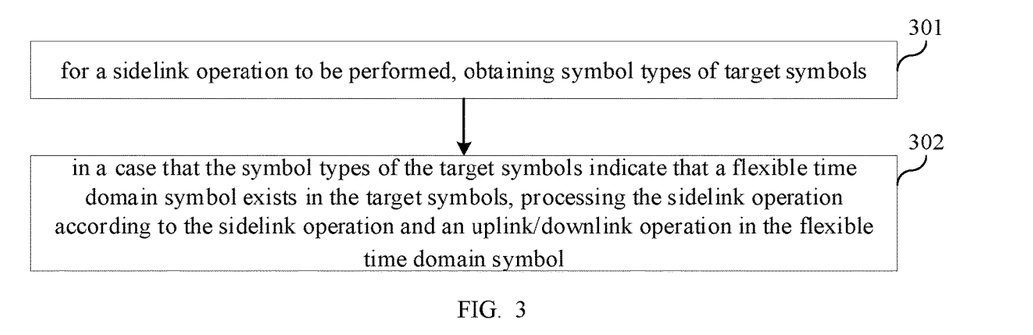
FIG. 3 is a flowchart of a method for processing a sidelink operation according to an example embodiment.

FIG. 3 is a flowchart illustrating a method for processing a sidelink operation according to an example embodiment. The method for processing a sidelink operation may be performed by a user equipment. For example, the user equipment may be the user equipment 210 in the implementation environment shown in FIG. 2. As shown in FIG. 3, the method may include the following steps.

In step 301, for a sidelink operation to be performed, symbol types of target symbols are obtained.

The target symbols include respective time domain symbols where a sidelink resource used by the sidelink operation is located.

In step 302, in a case that the symbol types of the target symbols indicate that a flexible time domain symbol exists in the target symbols, the sidelink operation is processed according to the sidelink operation and an uplink/downlink operation in the flexible time domain symbol.

In an optional implementation, in a case that the symbol types of the target symbols indicate that the flexible time domain symbol exists in the target symbols, processing the sidelink operation according to the sidelink operation and the uplink/downlink operation in the flexible time domain symbol, includes:

in a case that uplink/downlink operation is a downlink operation that needs to be performed in the flexible time domain symbol, abandoning the sidelink operation.

The downlink operation includes a downlink receiving operation, or a downlink measurement operation.

In an optional implementation, in a case that the symbol types of the target symbols indicate that the flexible time domain symbol exists in the target symbols, processing the sidelink operation according to the sidelink operation and the uplink/downlink operation in the flexible time domain symbol, includes:

in a case that the sidelink operation is a sidelink sending operation, and the uplink/downlink operation is an uplink operation that needs to be performed in the flexible time domain symbol, performing the sidelink sending operation.

The uplink operation includes an uplink sending operation.

In an optional implementation, a sum of a sending power of the sidelink sending operation and a sending power of the uplink operation is not greater than a total sending power of the user equipment.

In an optional implementation solution, performing the sidelink sending operation includes:

obtaining a first priority of information sent by the sidelink sending operation, and a second priority of information sent by the uplink operation;

in a case that the first priority is not lower than the second priority, performing the sidelink sending operation.

In an optional implementation solution, in a case that the symbol types of the target symbols indicate that the flexible time domain symbol exists in the target symbols, processing the sidelink operation according to the sidelink operation and the uplink/downlink operation in the flexible time domain symbol, includes:

in a case that the sidelink operation is a sidelink sending operation and there is no uplink/downlink operation, obtaining a scheduling mode of the sidelink sending operation and a configuration mode of the flexible time domain symbol;

processing the sidelink sending operation according to the scheduling mode of the sidelink sending operation and the configuration mode of the flexible time domain symbol.

In an optional implementation, processing the sidelink sending operation according to the scheduling mode of the sidelink sending operation and the configuration mode of the flexible time domain symbol, includes:

in a case that the scheduling mode of the sidelink sending operation is a first scheduling mode, and the configuration mode of the flexible time domain symbol is a first configuration mode, abandoning the sidelink sending operation;

in a case that the scheduling mode of the sidelink sending operation is the first scheduling mode, and the configuration mode of the flexible time domain symbol is a second configuration mode, performing the sidelink sending operation.

The first scheduling mode indicates that the sidelink sending operation is a sidelink sending operation dynamically scheduled by a downlink control information (DCI) signaling.

The first configuration mode indicates that the flexible time domain symbol is configured by a base station through a semi-static signaling, and is dynamically indicated by the base station through the DCI signaling.

The second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and are indicated by other user equipment through sidelink control information or sidelink broadcast information; or, the second configuration mode indicates that the flexible time domain symbol is configured by the user equipment by default when a configuration is not received from the base station and there is no pre-configuration.

In an optional implementation, processing the sidelink sending operation according to the scheduling mode of the sidelink sending operation and the configuration mode of the flexible time domain symbol includes:

in a case that the scheduling mode of the sidelink sending operation is a second scheduling mode, and the configuration mode of the flexible time domain symbol is a third configuration mode, performing the sidelink sending operation;

in a case that the scheduling mode of the sidelink transmission operation is the second scheduling mode, and the configuration mode of the flexible time domain symbol is a fourth configuration mode, abandoning the sidelink sending operation.

The second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel.

The third configuration mode indicates that the flexible time domain symbol is configured by the user equipment by default when a configuration is not received from the base station and there is no pre-configuration.

The fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and is indicated by other user equipments through sidelink control information or sidelink broadcast information.

In an optional implementation, processing the sidelink sending operation according to the scheduling mode of the sidelink sending operation and the configuration mode of the flexible time domain symbol includes:

in a case that the scheduling mode of the sidelink sending operation is a third scheduling mode, and the configuration mode of the flexible time domain symbol is a fifth configuration mode, performing the sidelink sending operation;

in a case that the scheduling mode of the sidelink sending operation is the third scheduling mode, and the configuration mode of the flexible time domain symbol is a sixth configuration mode, abandoning the sidelink sending operation.

The third scheduling mode indicates that the sidelink sending operation is a sidelink transmission operation scheduled by sidelink control information sent by other user equipments other than the user equipment.

The fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration.

The sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

In an optional implementation, in a case that the symbol type of the target symbol indicates that flexible time domain symbols exist in the target symbol, processing the sidelink operation according to the sidelink operation and the uplink/downlink operation in the flexible time domain symbol, includes:

in a case that the sidelink operation is a sidelink receiving operation and there is no uplink/downlink operation, performing the sidelink receiving operation.

In an optional implementation, the sidelink receiving operation includes at least one of the following operations:

performing blind detection on a sidelink control channels of other user equipments other than the user equipment;

receiving a sidelink data channel associated with correctly received sidelink control information;

performing blind detection and/or reception on the sidelink control channel or sidelink data channel in time-frequency resources reserved in the correctly received sidelink control information;

performing measurement on time-frequency resources used for correctly received sidelink control information and/or sidelink data transmission associated with the sidelink control information.

In conclusion, in the solutions illustrated in embodiments of the present disclosure, when there are flexible time domain symbols in the time domain symbols corresponding to the sidelink resource, the user equipment can process the sidelink operation in combination with the sidelink operation and the uplink/downlink operation in the flexible time domain symbols, thereby providing a coordinated processing scheme of the sidelink operation based on the flexible time domain symbols, which realizes the compatibility of sidelink and flexible time domain symbols.

Figure 4:
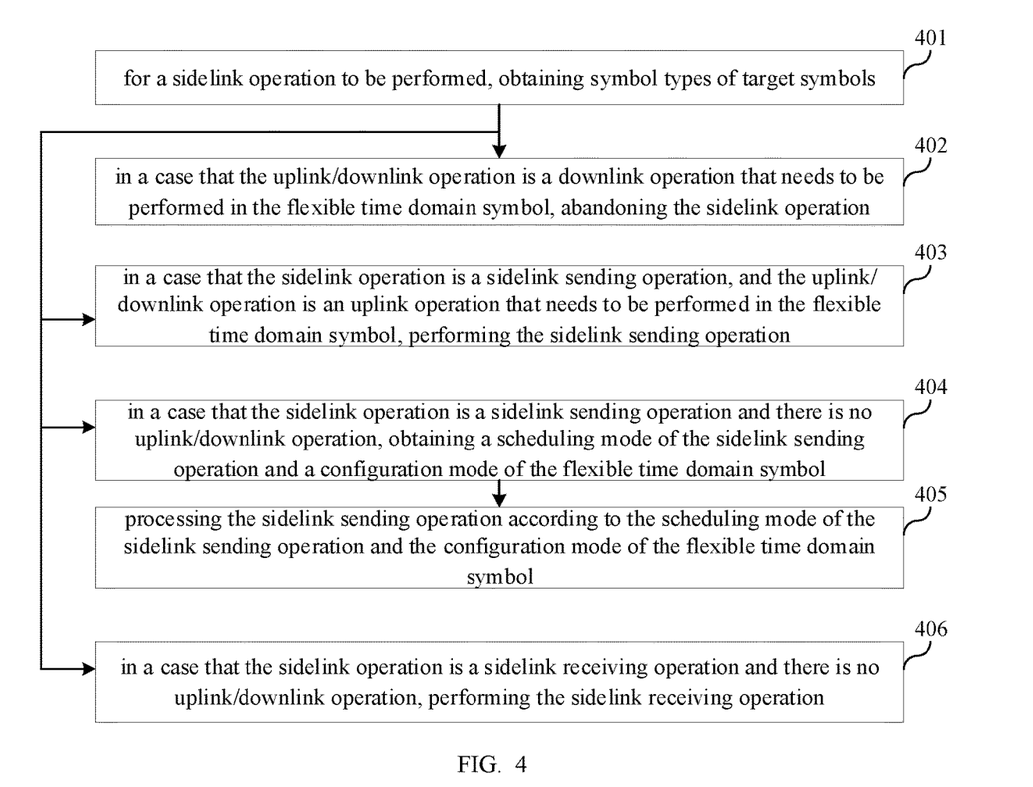
FIG. 4 is a flowchart of a method for processing a sidelink according to an example embodiment.

FIG. 4 is a flowchart illustrating a method for processing a sidelink operation according to an example embodiment. The method for processing a sidelink operation may be performed by a user equipment. For example, the user equipment may be the user equipment 210 in the implementation environment shown in FIG. 2. As shown in FIG. 4, the method may include the following steps.

In step 401, for a sidelink operation to be performed, symbol types of target symbols are obtained.

The target symbols include respective time domain symbols where a sidelink resource used by the sidelink operation is located.

In embodiments of the present disclosure, when the user equipment is scheduled for sidelink transmission, before performing the corresponding sidelink operation, the user equipment first obtains respective time domain symbols corresponding to the corresponding sidelink resource, and according to the configured flexible time domain symbols, determines whether there are flexible time domain symbols in the respective time domain symbols corresponding to the sidelink resource.

After obtaining the symbol types of the target symbols, when the symbol types of the target symbols indicate that there is the flexible time domain symbol in the target symbols, the user equipment can process the sidelink operation according to the sidelink operation and an uplink/downlink operation in the flexible time domain symbol. For the above process of sidelink operation, please refer to the following steps.

In step 402, in a case that the uplink/downlink operation is a downlink operation that needs to be performed in the flexible time domain symbol, the sidelink operation is abandoned.

The downlink operation includes a downlink receiving operation or a downlink measurement operation.

When the time domain symbols corresponding to the uplink/downlink operation include the flexible time domain symbol, the user equipment can determine whether the uplink/downlink operation needs to be performed or abandoned in the flexible time domain symbol according to rules.

In embodiments of the present disclosure, if the uplink/downlink operation that the user equipments needs to perform on the flexible time domain symbol is a downlink operation, for example, downlink receiving data or control instructions sent by the base station, or downlink measuring signals from the base station, the user equipment can abandon the sidelink operation.

In a possible implementation, abandoning the sidelink operation includes:

abandoning the whole sidelink operation; or abandoning a part of the sidelink operation that is performed in the flexible time domain signal.

A scheduled sidelink operation may need to occupy multiple OFDM symbols, and some of the multiple OFDM symbols may be flexible time domain symbols, and others may be uplink time domain symbols or downlink time domain symbols. When abandoning the sidelink operation, the user equipment may abandon the whole sidelink operation scheduled at this time, or may only abandon a part corresponding to the flexible time domain symbols of the sidelink operation scheduled at this time.

That is to say, when an operation such as sidelink sending, receiving, and measuring occurs on a time domain symbol configured as a flexible time domain symbol, if the user equipment needs to perform a downlink operation, such as PDCCH monitoring, downlink data receiving, and channel state information-reference signal (CSI-RS) measurement, on the flexible time domain signal, the user equipment abandons the operation such as sidelink sending, receiving, and measuring on the time domain resource corresponding to the flexible time domain symbol. Here, the entire sidelink operation may be discarded, or only a part of the sidelink operation on symbols including the overlapping may be discarded.

In step 403, in a case that the sidelink operation is a sidelink sending operation, and the uplink/downlink operation is an uplink operation that need to be performed in the flexible time domain symbol, the sidelink sending operation is performed;

The uplink operation includes an uplink sending operation.

In an optional implementation, a sum of a sending power of the sidelink sending operation and a sending power of the uplink operation does not exceed a total sending power of the user equipment.

In an optional implementation, in a case that the sidelink operation is the sidelink sending operation, and the uplink/downlink operation is the uplink operation that needs to be performed in the flexible time domain symbol, performing the sidelink sending operation, includes:

obtaining a first priority of information sent by the sidelink sending operation and a second priority of information sent by the uplink operation; in a case that the first priority is not lower than the second priority, performing the sidelink sending operation.

That is to say, when the time domains of the sidelink sending and the flexible symbol overlap, if the user equipment needs to perform the uplink operation such as uplink data channel sending, uplink control channel sending, and uplink SRS sending on the flexible time domain symbol, the user equipment can perform the sidelink sending operation on the time domain resource corresponding to the flexible time domain symbol.

When the uplink transmission and the sidelink sending operation of the user equipment occur on the same time domain symbol, the user equipment can perform the uplink transmission and the sidelink sending operation at the same time, and the two need to share the uplink sending power according to specific rules (for example, the sum of the uplink sending power of the two does not exceed the total sending power of the user equipment). Alternatively, the user equipment may also discard the uplink transmission or discard the sidelink sending operation according to specific rules.

When the user equipment discards the uplink transmission, or discards the sidelink sending operation, according to specific rules, the user equipment may determine priorities according to the types of the two sent contents. The priority of the sent content which is a control signaling is higher than the priority of the sent content which is data, and the priority of the sent content which is data is higher than the priority of the sent content which is a reference signal. If the type of sent content is the same, the user equipment can further determine the priorities of the two according to the sent content, for example, according to the QoS requirements of the sent content. For example, when the content types of the uplink transmission and the sidelink are the same, the user equipment can perform the sending operation with the higher QoS requirement and discard the sending operation with the lower QoS requirement.

In step 404, in a case that the sidelink operation is a sidelink sending operation and there is no uplink/downlink operation, a scheduling mode of the sidelink sending operation and a configuration mode of the flexible time domain symbol are obtained.

That is to say, when the time domain coincidence occurs between the sidelink sending and the flexible symbol, and there is no uplink or downlink operation that overlaps with the flexible time domain symbol in the time domain, the user equipment can determine whether to perform the sidelink sending according to the configuration of the slot symbol and the scheduling mode of the sidelink sending.

In step 405, the sidelink sending operation is processed according to the scheduling mode of the sidelink sending operation and the configuration mode of the flexible time domain symbol.

In an optional implementation, processing the sidelink sending operation according to the scheduling mode of the sidelink sending operation and the configuration mode of the flexible time domain symbol includes:

in a case that the scheduling mode of the sidelink sending operation is a first scheduling mode, and the configuration mode of the flexible time domain symbol is a first configuration mode, abandoning the sidelink sending operation;

in a case that the scheduling mode of the sidelink sending operation is the first scheduling mode, and the configuration mode of the flexible time domain symbol is a second configuration mode, performing the sidelink sending operation.

The first scheduling mode indicates that the sidelink sending operation is a sidelink sending operation dynamically scheduled by a downlink control information (DCI) signaling.

The first configuration mode indicates that the flexible time domain symbol is configured by a base station through a semi-static signaling, and is dynamically indicated by the base station through the DCI signaling.

The second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and is indicated by other user equipment through sidelink control information or sidelink broadcast information; or, the second configuration mode indicates that the flexible time domain symbol is configured by the user equipment by default when a configuration is not received from the base station and there is no pre-configuration.

In an optional implementation, processing the sidelink sending operation according to the scheduling mode of the sidelink sending operation and the configuration mode of the flexible time domain symbol includes:

in a case that the scheduling mode of the sidelink sending operation is a second scheduling mode, and the configuration mode of the flexible time domain symbol is a third configuration mode, performing the sidelink sending operation;

in a case that the scheduling mode of the sidelink transmission operation is the second scheduling mode, and the configuration mode of the flexible time domain symbol is a fourth configuration mode, abandoning the sidelink sending operation.

The second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel.

The third configuration mode indicates that the flexible time domain symbol is configured by the user equipment by default when a configuration is not received from the base station and there is no pre-configuration.

The fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and is indicated by other user equipments through sidelink control information or sidelink broadcast information.

In an optional implementation, processing the sidelink sending operation according to the scheduling mode of the sidelink sending operation and the configuration mode of the flexible time domain symbol includes:

in a case that the scheduling mode of the sidelink sending operation is a third scheduling mode, and the configuration mode of the flexible time domain symbol is a fifth configuration mode, performing the sidelink sending operation;

in a case that the scheduling mode of the sidelink sending operation is the third scheduling mode, and the configuration mode of the flexible time domain symbol is a sixth configuration mode, abandoning the sidelink sending operation.

The third scheduling mode indicates that the sidelink sending operation is a sidelink transmission operation scheduled by sidelink control information sent by other user equipments other than the user equipment.

The fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration.

The sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

First, in embodiments of the present disclosure, possible methods for configuring the slot symbols as the flexible time domain symbols include at least one or more of the following methods:

1) The base station configures the flexible symbols through downlink semi-static public signaling, and does not indicate the slot format through downlink dynamic control signaling;
2) The base station configures the flexible symbols through downlink semi-static user-specific signaling, and does not indicate the slot format through downlink dynamic control signaling;
3) The base station configures the flexible symbols through downlink semi-static signaling, and indicates them through downlink dynamic control signaling (such as DCI signaling);
4) The configuration and indication are not received from the base station, and the slot format pre-configured in the user equipment indicates the flexible symbols;
5) The configuration and indication are not received from the base station, the slot format pre-configured in the user equipment indicates the flexible symbols, and the slot format configuration indicating the flexible symbols is obtained by receiving sidelink control information or sidelink broadcast information sent by other users;
6) When the user equipment does not receive any configuration, all symbols are flexible symbols by default.

Second, in embodiments of the present disclosure, scheduling methods for sidelink sending at least include one or more of the followings:

A) Physical Sidelink Share Channel, PSSCH, transmission scheduled by the base station through dynamic downlink control signaling, and its corresponding Physical Sidelink Control Channel (PSCCH) and/or physical sidelink feedback channel (PSFCH) transmission;
B) PSSCH transmission configured by the base station through semi-static downlink signaling, and its corresponding PSCCH and/or PSFCH transmission;
C) sidelink data channel transmission in which the user equipment autonomously selects time and frequency resources, and its corresponding direct connection control channel and/or feedback channel transmission;
D) receiving the sidelink channel transmission scheduled by the sidelink control information sent by other user equipments, and its corresponding control and/or feedback channel transmission;
E) sending of sidelink synchronization signals and/or sidelink broadcast channels.

Third, in embodiments of the present disclosure, according to the configuration method of flexible symbols and the scheduling method of sidelink sending, the user equipment selects one of the following processing methods:

I) The user equipment can use the time-frequency resources on the flexible symbols to send sidelink signals or channels;

II) The user equipment cannot use the time-frequency resources on the flexible symbols to send sidelink signals or channels, and the user equipment discards or abandons the sidelink sending that collides with the flexible symbols.

Here, the entire sidelink sending may be discarded, or only the part of sidelink sending including the overlapping may be discarded.

When the user equipment decides whether to discard the sidelink sending, the following three strategies can be adopted:

a) For DCI-scheduled sidelink transmission (A), which corresponds to the first scheduling mode, when the flexible symbol is indicated by method 3, that is, corresponding to the first configuration mode, processing mode II is selected; for DCI-scheduled sidelink transmission (A), when the flexible symbol is indicated by other methods (such as method 1, 2, 3, 5 or 6 above), processing mode I is selected.

b) For semi-statically configured sidelink transmission (B), or user-selected sidelink transmission (C), or sidelink synchronization signal and sidelink broadcast channel transmission (E), that is, corresponding to the second scheduling method, when the configuration method of the flexible symbol is 6, that is, corresponds to the second configuration mode, the processing mode I is selected; for the semi-statically configured sidelink transmission (B), or the user-selected sidelink transmission (C), or the sidelink synchronization signal and sidelink broadcast channel transmission (E), when the configuration method of the flexible symbol is other methods (such as the above method 1, 2, 3, 4 or 5), the processing mode II is selected.

c) For the sidelink transmission (D) scheduled by other user equipments, that is, corresponding to the third scheduling mode, when the configuration method of the flexible symbol is 4 or 6, that is, corresponding to the third configuration mode, the processing mode I is selected; for the sidelink transmission (D) scheduled by the other user equipments, when the flexible symbol configuration method is other methods (such as the above method 1, 2, 3 or 5), the processing mode II is selected.

In step 406, in a case that the sidelink operation is a sidelink receiving operation, and there is no uplink/downlink operation, the sidelink receiving operation is performed.

In embodiments of the present disclosure, when the time domain coincidence of the sidelink receiving or measurement and the flexible symbol occurs, and no uplink or downlink operation coincides with the flexible symbol in the time domain, the user equipment performs receiving and measurement on the flexible symbol.

In an optional implementation, the sidelink receiving operation includes at least one of the following operations:
performing blind detection on a sidelink control channels of other user equipments other than the user equipment;
receiving a sidelink data channel associated with correctly received sidelink control information;
performing blind detection and/or reception on the sidelink control channel or sidelink data channel in time-frequency resources reserved in the correctly received sidelink control information;
performing measurement on time-frequency resources used for correctly received sidelink control information and/or sidelink data transmission associated with the sidelink control information.

In conclusion, according to the solutions illustrated in embodiments of the present disclosure, when the flexible time domain symbol exists in the time domain symbols corresponding to the sidelink resource, the user equipment can process the sidelink operation in combination with the sidelink operation and the uplink/downlink operation in the flexible time domain symbol, thereby providing a coordinated processing scheme of the sidelink operation based on the flexible time domain symbols, which realizes the compatibility of sidelink and flexible time domain symbols.

The following are the apparatus embodiments of the present disclosure, which can be configured to implement the method embodiments of the present disclosure. For details not disclosed in the apparatus embodiments of the present disclosure, please refer to the method embodiments of the present disclosure.

Figure 5:
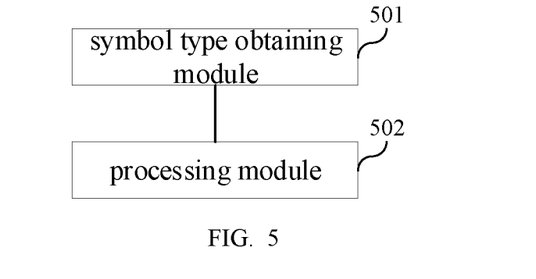
FIG. 5 is a block diagram of an apparatus for processing a sidelink operation according to an example embodiment.

FIG. 5 is a block diagram of an apparatus for processing a sidelink operation according to an example embodiment. As shown in FIG. 5, the apparatus for processing a sidelink operation can be implemented by hardware or a combination of software and hardware as a whole or part of the user equipment 120 in the implementation environment shown in FIG. 2 to perform the steps performed by the user equipment in the embodiment shown in FIG. 3 or FIG. 4. The apparatus for processing a sidelink operation may include a symbol type obtaining module 501 and a processing module 502.

The symbol type obtaining module 501 is configured to, for a sidelink operation to be performed, obtain symbol types of target symbols, wherein the target symbols include respective time domain symbols where a sidelink resource used by the sidelink operation is located.

The processing module 502 is configured to, in a case that the symbol types of the target symbols indicate that a flexible time domain symbol exists in the target symbols, process the sidelink operation according to the sidelink operation and an uplink/downlink operation in the flexible time domain symbol.

In an optional implementation, the processing module 502 includes:
a first processing submodule, configured to, in a case that the uplink/downlink operation is a downlink operation that needs to be performed in the flexible time domain symbol, abandon the sidelink operation.

The downlink operation includes a downlink receiving operation, or a downlink measurement operation.

In an optional implementation, the processing module 502 includes:
a second processing submodule, configured to, in a case that the sidelink operation is a sidelink sending operation, and the uplink/downlink operation is an uplink operation that needs to be performed in the flexible time domain symbol, perform the sidelink sending operation.

The uplink operation includes an uplink sending operation.

In an optional implementation, a sum of a sending power of the sidelink sending operation and a sending power of the uplink operation is not greater than a total sending power of the user equipment.

In an optional implementation, the second processing submodule is configured to:
obtain a first priority of information sent by the sidelink sending operation, and a second priority of information sent by the uplink operation;
in a case that the first priority is not lower than the second priority, perform the sidelink sending operation.

In an optional implementation, the processing module 502 includes:
a scheduling and configuration mode obtaining submodule, configured to, in a case that the sidelink operation is a sidelink sending operation and there is no uplink/downlink operation, obtain a scheduling mode of the sidelink sending operation and a configuration mode of the flexible time domain symbol;
a third processing submodule, configured to process the sidelink sending operation according to the scheduling mode of the sidelink sending operation and the configuration mode of the flexible time domain symbol.

In an optional implementation, the third processing submodule is configured to:
in a case that the scheduling mode of the sidelink sending operation is a first scheduling mode, and the configuration mode of the flexible time domain symbol is a first configuration mode, abandon the sidelink sending operation;
in a case that the scheduling mode of the sidelink sending operation is the first scheduling mode, and the configuration mode of the flexible time domain symbol is a second configuration mode, perform the sidelink sending operation.

The first scheduling mode indicates that the sidelink sending operation is a sidelink sending operation dynamically scheduled by a downlink control information (DCI) signaling.

The first configuration mode indicates that the flexible time domain symbol is configured by a base station through a semi-static signaling, and is dynamically indicated by the base station through the DCI signaling.

The second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and is indicated by other user equipment through sidelink control information or sidelink broadcast information; or, the second configuration mode indicates that the flexible time domain symbol is configured by the user equipment by default when a configuration is not received from the base station and there is no pre-configuration.

In an optional implementation, the third processing submodule is configured to:

in a case that the scheduling mode of the sidelink sending operation is a second scheduling mode, and the configuration mode of the flexible time domain symbol is a third configuration mode, perform the sidelink sending operation;

in a case that the scheduling mode of the sidelink transmission operation is the second scheduling mode, and the configuration mode of the flexible time domain symbol is a fourth configuration mode, abandon the sidelink sending operation.

The second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel.

The third configuration mode indicates that the flexible time domain symbol is configured by the user equipment by default when a configuration is not received from the base station and there is no pre-configuration.

The fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and is indicated by other user equipments through sidelink control information or sidelink broadcast information.

In an optional implementation, the third processing submodule is configured to:

in a case that the scheduling mode of the sidelink sending operation is a third scheduling mode, and the configuration mode of the flexible time domain symbol is a fifth configuration mode, perform the sidelink sending operation;

in a case that the scheduling mode of the sidelink sending operation is the third scheduling mode, and the configuration mode of the flexible time domain symbol is a sixth configuration mode, abandon the sidelink sending operation.

The third scheduling mode indicates that the sidelink sending operation is a sidelink transmission operation scheduled by sidelink control information sent by other user equipments other than the user equipment.

The fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration.

The sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

Optionally, for abandoning the sidelink operation, the processing module 502 is configured to:

abandon the whole sidelink operation;

or, abandon a part of the sidelink operation performed in the flexible time domain symbol.

In an optional implementation, the processing module 502 includes:

a fourth processing submodule, configured to, in a case that the sidelink operation is a sidelink receiving operation and there is no uplink/downlink operation, perform the sidelink receiving operation.

In an optional implementation, the sidelink receiving operation includes at least one of following operations:

performing blind detection on a sidelink control channels of other user equipments other than the user equipment;

receiving a sidelink data channel associated with correctly received sidelink control information;

performing blind detection and/or reception on the sidelink control channel or sidelink data channel in time-frequency resources reserved in the correctly received sidelink control information;

performing measurement on time-frequency resources used for correctly received sidelink control information and/or sidelink data transmission associated with the sidelink control information.

In conclusion, with the solutions illustrated in embodiments of the present disclosure, when the flexible time domain symbol exists in the time domain symbols corresponding to the sidelink resource, the user equipment can process the sidelink operation in combination with the sidelink operation and the uplink/downlink operation in the flexible time domain symbol, thereby providing a coordinated processing scheme of the sidelink operation based on the flexible time domain symbols, which realizes the compatibility of sidelink and flexible time domain symbols.

An example embodiment of the present disclosure also provides a data transmission system. The system includes: at least two user equipments and a base station.

The user equipment includes the apparatus for processing a sidelink operation provided in the embodiment shown in FIG. 5 above.

It should be noted that, when the apparatus provided in the above embodiment realizes its functions, only the division of the above functional modules is used as an example for illustration. In practical applications, the above functions can be allocated to different functional modules according to actual needs. That is, the content structure of the apparatus is divided into different functional modules to complete all or part of the functions described above.

Regarding the apparatus in the above embodiments, the specific manner in which each module performs operations has been described in detail in the embodiments of the method, and will not be described in detail here.

An example embodiment of the present disclosure provides an apparatus for processing a sidelink operation, which can implement all or part of the steps performed by the user equipment in the above embodiments shown in FIG. 3 or FIG. 4 of the present disclosure. The apparatus for processing a sidelink operation includes a processor and a memory configured to store instructions executable by the processor.

The processor is configured to:
for a sidelink operation to be performed, obtain symbol types of target symbols, wherein the target symbols include respective time domain symbols where a sidelink resource used by the sidelink operation is located;
in a case that the symbol types of the target symbols indicate that a flexible time domain symbol exists in the target symbols, process the sidelink operation according to the sidelink operation and an uplink/downlink operation in the flexible time domain symbol.

In an optional implementation, in a case that the symbol types of the target symbols indicate that the flexible time domain symbol exists in the target symbol, processing the sidelink operation according to the sidelink operation and the uplink/downlink operation in the flexible time domain symbol, includes:
in a case that the uplink/downlink operation is a downlink operation that needs to be performed in the flexible time domain symbol, abandoning the sidelink operation;
wherein, the downlink operation includes a downlink receiving operation, or a downlink measurement operation.

In an optional implementation, in a case that the symbol types of the target symbols indicate that the flexible time domain symbol exists in the target symbol, processing the sidelink operation according to the sidelink operation and the uplink/downlink operation in the flexible time domain symbol, includes:
in a case that the sidelink operation is a sidelink sending operation, and the uplink/downlink operation is an uplink operation that needs to be performed in the flexible time domain symbol, performing the sidelink sending operation;
wherein, the uplink operation includes an uplink sending operation.

In an optional implementation, a sum of a sending power of the sidelink sending operation and a sending power of the uplink operation is not greater than a total sending power of the user equipment.

In an optional implementation, performing the sidelink sending operation includes:
obtaining a first priority of information sent by the sidelink sending operation, and a second priority of information sent by the uplink operation;
in a case that the first priority is not lower than the second priority, performing the sidelink sending operation.

In an optional implementation, in a case that the symbol types of the target symbols indicate that the flexible time domain symbol exists in the target symbol, processing the sidelink operation according to the sidelink operation and the uplink/downlink operation in the flexible time domain symbol, includes:
in a case that the sidelink operation is a sidelink sending operation and there is no uplink/downlink operation, obtaining a scheduling mode of the sidelink sending operation and a configuration mode of the flexible time domain symbol;
processing the sidelink sending operation according to the scheduling mode of the sidelink sending operation and the configuration mode of the flexible time domain symbol.

In an optional implementation, processing the sidelink sending operation according to the scheduling mode of the sidelink sending operation and the configuration mode of the flexible time domain symbol includes:
in a case that the scheduling mode of the sidelink sending operation is a first scheduling mode, and the configuration mode of the flexible time domain symbol is a first configuration mode, abandoning the sidelink sending operation;
in a case that the scheduling mode of the sidelink sending operation is the first scheduling mode, and the configuration mode of the flexible time domain symbol is a second configuration mode, performing the sidelink sending operation;
wherein, the first scheduling mode indicates that the sidelink sending operation is a sidelink sending operation dynamically scheduled by a downlink control information (DCI) signaling;
the first configuration mode indicates that the flexible time domain symbol is configured by a base station through a semi-static signaling, and is dynamically indicated by the base station through the DCI signaling;
the second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and is indicated by other user equipment through sidelink control information or sidelink broadcast information; or, the second configuration mode indicates that the flexible time domain symbol is configured by the user equipment by default when a configuration is not received from the base station and there is no pre-configuration.

In an optional implementation, processing the sidelink sending operation according to the scheduling mode of the sidelink sending operation and the configuration mode of the flexible time domain symbol includes:
- in a case that the scheduling mode of the sidelink sending operation is a second scheduling mode, and the configuration mode of the flexible time domain symbol is a third configuration mode, performing the sidelink sending operation;
- in a case that the scheduling mode of the sidelink transmission operation is the second scheduling mode, and the configuration mode of the flexible time domain symbol is a fourth configuration mode, abandoning the sidelink sending operation;
- wherein, the second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel;
- the third configuration mode indicates that the flexible time domain symbol is configured by the user equipment by default when a configuration is not received from the base station and there is no pre-configuration;
- the fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and is indicated by other user equipments through sidelink control information or sidelink broadcast information.

In an optional implementation, processing the sidelink sending operation according to the scheduling mode of the sidelink sending operation and the configuration mode of the flexible time domain symbol includes:
- in a case that the scheduling mode of the sidelink sending operation is a third scheduling mode, and the configuration mode of the flexible time domain symbol is a fifth configuration mode, performing the sidelink sending operation;
- in a case that the scheduling mode of the sidelink sending operation is the third scheduling mode, and the configuration mode of the flexible time domain symbol is a sixth configuration mode, abandoning the sidelink sending operation;
- wherein, the third scheduling mode indicates that the sidelink sending operation is a sidelink transmission operation scheduled by sidelink control information sent by other user equipments other than the user equipment;
- the fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration;
- the sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

In an optional solution, abandoning the sidelink operation includes:
- abandoning the whole sidelink operation;
or,
- abandoning a part of the sidelink operation performed in the flexible time domain symbol.

In an optional implementation, in a case that the symbol types of the target symbols indicate that the flexible time domain symbol exists in the target symbols, processing the sidelink operation according to the sidelink operation and the uplink/downlink operation in the flexible time domain symbol, includes:
- in a case that the sidelink operation is a sidelink receiving operation and there is no uplink/downlink operation, performing the sidelink receiving operation.

In an optional implementation, the sidelink receiving operation includes at least one of following operations:

performing blind detection on a sidelink control channels of other user equipments other than the user equipment;

receiving a sidelink data channel associated with correctly received sidelink control information;

performing blind detection and/or reception on the sidelink control channel or sidelink data channel in time-frequency resources reserved in the correctly received sidelink control information;

performing measurement on time-frequency resources used for correctly received sidelink control information and/or sidelink data transmission associated with the sidelink control information.

The foregoing mainly takes the user equipment as an example to introduce the solutions provided by the embodiments of the present disclosure. It can be understood that, in order to implement the above functions, the user equipment includes corresponding hardware structures and/or software modules for executing respective functions. In conjunction with the modules and algorithm steps of each example described in the embodiments disclosed in the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 6:
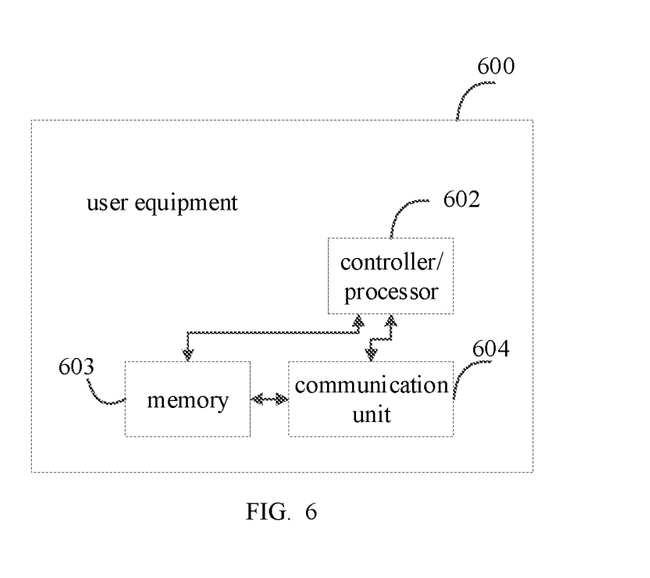
FIG. 6 is a block diagram of a user equipment according to an example embodiment.

FIG. 6 is a schematic diagram of a user equipment according to an example embodiment. The user equipment may be implemented as the user equipment in the system environment shown in FIG. 1 above.

The user equipment 600 includes a communication unit 604 and a processor 602. The processor 602 may also be a controller, which is represented as "controller/processor 602" in FIG. 6. The communication unit 604 is used to support the user equipment to communicate with other network entities (e.g., other user equipments or base stations, etc.).

Further, the user equipment 600 may further include a memory 603 for storing program codes and data of the user equipment 600.

It will be appreciated that FIG. 6 only shows a simplified design of the user equipment 600. In practical applications, the user equipment 600 may include any number of processors, controllers, memories, communication units, etc., and all user equipments that can implement the embodiments of the present disclosure fall within the protection scope of the embodiments of the present disclosure.

Those skilled in the art should realize that, in one or more of the above examples, the functions described in the embodiments of the present disclosure may be implemented by hardware, software, firmware, or any combination thereof. When implemented in software, the functions may be stored on or transmitted over as one or more instructions or codes on a computer-readable medium. Computer-readable medium includes both computer storage medium and communication medium including any medium that facilitates transfer of a computer program from one place to another. The storage medium may be any available medium that can be accessed by a general purpose or special purpose computer.

Embodiments of the present disclosure further provide a computer storage medium configured to store computer software instructions for the user equipment, including a program designed for executing the method for processing a sidelink operation described above.

After considering the specification and practicing the disclosure herein, those skilled in the art will easily think of other embodiments of the present disclosure. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for processing a sidelink operation, comprising:

for a sidelink operation to be performed, obtaining, by a user equipment, symbol types of target symbols, wherein the target symbols comprise respective time domain symbols where a sidelink resource used by the sidelink operation is located;

wherein the symbol types of the target symbols indicate that a flexible time domain symbol exists in the target symbols;

processing the sidelink operation according to the sidelink operation and the flexible time domain symbol;

wherein processing the sidelink operation according to the sidelink operation and the flexible time domain symbol, comprises at least one of:

in response to an uplink/downlink operation in the flexible time domain symbol being a downlink operation that needs to be performed in the flexible time domain symbol, abandoning the sidelink operation;

in response to the sidelink operation being a sidelink sending operation, and the uplink/downlink operation the flexible time domain symbol being an uplink operation that needs to be performed in the flexible time domain symbol, performing the sidelink sending operation; and in response to the sidelink operation being a sidelink sending operation and there being no uplink/downlink operation the flexible time domain symbol, obtaining a scheduling mode of the sidelink sending operation and a configuration mode of the flexible time domain symbol; and processing the sidelink sending operation according to the scheduling mode of the sidelink sending operation and the configuration mode of the flexible time domain symbol.

2. The method of claim 1, wherein, the downlink operation comprises a downlink receiving operation, or a downlink measurement operation.

3. The method of claim 1, wherein, the uplink operation comprises an uplink sending operation.

4. The method of claim 3, wherein a sum of a sending power of the sidelink sending operation and a sending power of the uplink operation is not greater than a total sending power of the user equipment.

5. The method of claim 3, wherein performing the sidelink sending operation comprises:

obtaining a first priority of information sent by the sidelink sending operation, and a second priority of information sent by the uplink operation;

in a case that the first priority is not lower than the second priority, performing the sidelink sending operation.

6. The method of claim 1, wherein processing the sidelink sending operation according to the scheduling mode of the sidelink sending operation and the configuration mode of the flexible time domain symbol comprises:

in response to the scheduling mode of the sidelink sending operation being a first scheduling mode, and the configuration mode of the flexible time domain symbol being a first configuration mode, abandoning the sidelink sending operation;

in response to the scheduling mode of the sidelink sending operation being the first scheduling mode, and the configuration mode of the flexible time domain symbol being a second configuration mode, performing the sidelink sending operation;

wherein, the first scheduling mode indicates that the sidelink sending operation is a sidelink sending operation dynamically scheduled by a downlink control information (DCI) signaling;

the first configuration mode indicates that the flexible time domain symbol is configured by a base station through a semi-static signaling, and is dynamically indicated by the base station through the DCI signaling;

the second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and is indicated by other user equipments through sidelink control information or sidelink broadcast information; or, the second configuration mode indicates that the flexible time domain symbol is configured by the user equipment by default when a configuration is not received from the base station and there is no pre-configuration.

7. The method of claim 1, wherein processing the sidelink sending operation according to the scheduling mode of the sidelink sending operation and the configuration mode of the flexible time domain symbol comprises:

in response to the scheduling mode of the sidelink sending operation being a second scheduling mode, and the configuration mode of the flexible time domain symbol is a third configuration mode, performing the sidelink sending operation;

in response to the scheduling mode of the sidelink transmission operation being the second scheduling mode, and the configuration mode of the flexible time domain symbol is a fourth configuration mode, abandoning the sidelink sending operation;

wherein, the second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel;

the third configuration mode indicates that the flexible time domain symbol is configured by the user equipment by default when a configuration is not received from the base station and there is no pre-configuration;

the fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and are indicated by other user equipments through sidelink control information or sidelink broadcast information.

8. The method of claim 1, wherein processing the sidelink sending operation according to the scheduling mode of the sidelink sending operation and the configuration mode of the flexible time domain symbol comprises:

in response to the scheduling mode of the sidelink sending operation being a third scheduling mode, and the configuration mode of the flexible time domain symbol being a fifth configuration mode, performing the sidelink sending operation;

in response to the scheduling mode of the sidelink sending operation being the third scheduling mode, and the configuration mode of the flexible time domain symbol being a sixth configuration mode, abandoning the sidelink sending operation;

wherein, the third scheduling mode indicates that the sidelink sending operation is a sidelink transmission operation scheduled by sidelink control information sent by other user equipments other than the user equipment;

the fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration;

the sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

9. The method of claim 1, wherein in response to the symbol types of the target symbols indicating that a flexible time domain symbol exists in the target symbols, processing the sidelink operation according to the sidelink operation and an uplink/downlink operation in the flexible time domain symbol, comprises:
  in response to the sidelink operation being a sidelink receiving operation and there being no uplink/downlink operation, performing the sidelink receiving operation.

10. The method of claim 9, wherein the sidelink receiving operation comprises at least one of following operations:
  performing blind detection on a sidelink control channels of other user equipments other than the user equipment;
  receiving a sidelink data channel associated with correctly received sidelink control information;
  performing blind detection and/or reception on the sidelink control channel or sidelink data channel in time-frequency resources reserved in the correctly received sidelink control information;
  performing measurement on time-frequency resources used for correctly received sidelink control information and/or sidelink data transmission associated with the sidelink control information.

11. An apparatus for processing a sidelink operation, applied in a user equipment, comprising:
  a processor;
  a memory configured to store instructions executable by the processor;
  wherein, the processor is configured to:
  for a sidelink operation to be performed, obtain symbol types of target symbols, wherein the target symbols comprise respective time domain symbols where a sidelink resource used by the sidelink operation is located;
  wherein the symbol types of the target symbols indicate that a flexible time domain symbol exists in the target symbol;
  process the sidelink operation according to the sidelink operation and the flexible time domain symbol;
  wherein when the processor processes the sidelink operation according to the sidelink operation and the flexible time domain symbol, the processor is configured to perform at least one of:
  in response to an uplink/downlink operation in the flexible time domain symbol being a downlink operation that needs to be performed in the flexible time domain symbol, abandoning the sidelink operation;
  in response to the sidelink operation being a sidelink sending operation, and the uplink/downlink operation the flexible time domain symbol being an uplink operation that needs to be performed in the flexible time domain symbol, performing the sidelink sending operation; and
  in response to the sidelink operation being a sidelink sending operation and there being no uplink/downlink operation the flexible time domain symbol, obtaining a scheduling mode of the sidelink sending operation and a configuration mode of the flexible time domain symbol; and processing the sidelink sending operation according to the scheduling mode of the sidelink sending operation and the configuration mode of the flexible time domain symbol.

12. The apparatus of claim 11,
  wherein, the downlink operation comprises a downlink receiving operation, or a downlink measurement operation.

13. The apparatus of claim 11, wherein the processor is configured to:
  wherein, the uplink operation comprises an uplink sending operation.

14. The apparatus of claim 13, wherein the processor is configured to:
  obtain a first priority of information sent by the sidelink sending operation, and a second priority of information sent by the uplink operation;
  in a case that the first priority is not lower than the second priority, perform the sidelink sending operation.

15. The apparatus of claim 11, wherein the processor is configured to:
  in response to the scheduling mode of the sidelink sending operation being a first scheduling mode, and the configuration mode of the flexible time domain symbol being a first configuration mode, abandon the sidelink sending operation;
  in response to the scheduling mode of the sidelink sending operation being the first scheduling mode, and the configuration mode of the flexible time domain symbol being a second configuration mode, perform the sidelink sending operation;
  wherein, the first scheduling mode indicates that the sidelink sending operation is a sidelink sending operation dynamically scheduled by a downlink control information (DCI) signaling;
  the first configuration mode indicates that the flexible time domain symbol is configured by a base station through a semi-static signaling, and is dynamically indicated by the base station through the DCI signaling;
  the second configuration mode indicates that the flexible time domain symbol is configured by the base station through the semi-static signaling, and the base station does not dynamically indicate the flexible time domain symbol through the DCI signaling; or, the second configuration mode indicates that the flexible time domain symbol is configured by the base station through a user-specific semi-static signaling, and the base station does not dynamically indicate the flexible time domain symbol through the DCI signaling; or, the second configuration mode indicates that the flexible time domain symbol is configured by the user equipment according to a pre-configured slot format when a configuration is not received from the base station; or, the second configuration mode indicates that the flexible time domain symbol is configured by the user equipment according to the pre-configured slot format when a configuration is not received from the base station, and is indicated by other user equipments through sidelink control information or sidelink broadcast information; or, the second configuration mode indicates that the flexible time domain symbol is configured by the user equipment by default when a configuration is not received from the base station and there is no pre-configuration.

16. The apparatus of claim 11, wherein the processor is configured to:
in response to the scheduling mode of the sidelink sending operation being a second scheduling mode, and the configuration mode of the flexible time domain symbol being a third configuration mode, perform the sidelink sending operation;
in response to the scheduling mode of the sidelink transmission operation being the second scheduling mode, and the configuration mode of the flexible time domain symbol is being a fourth configuration mode, abandon the sidelink sending operation;
wherein, the second scheduling mode indicates that the sidelink sending operation is a sidelink sending operation configured by a base station through a semi-static signaling; or, the second scheduling mode indicates that the sidelink sending operation is a sidelink transmission operation of autonomously selecting the sidelink resource by the user equipment; or, the second scheduling mode indicates that the sidelink sending operation is a sending operation of a sidelink synchronization signal and/or a sidelink broadcast channel;
the third configuration mode indicates that the flexible time domain symbol is configured by the user equipment by default when a configuration is not received from the base station and there is no pre-configuration;
the fourth configuration mode indicates that the flexible time domain symbol is configured by the base station through a semi-static signaling, and the base station does not dynamically indicate the flexible time domain symbol through a DCI signaling; or, the fourth configuration mode indicates that the flexible time domain symbol is configured by the base station through a user-specific semi-static signaling, and the base station does not dynamically indicate the flexible time domain symbol through the DCI signaling; or, the fourth configuration mode indicates that the flexible time domain symbol is configured by the base station through a semi-static signaling, and is dynamically indicated by the base station through the DCI signaling; or, the fourth configuration mode indicates the flexible time domain symbol is configured by the user equipment according to a pre-configured slot format when a configuration is not received from the base station; or, the fourth configuration mode indicates that the flexible time domain symbol is configured by the user equipment according to the pre-configured slot format when a configuration is not received from the base station, and are indicated by other user equipments through sidelink control information or sidelink broadcast information.

17. The apparatus of claim 11, wherein the processor is configured to:
in response to the scheduling mode of the sidelink sending operation being a third scheduling mode, and the configuration mode of the flexible time domain symbol being a fifth configuration mode, perform the sidelink sending operation;
in response to the scheduling mode of the sidelink sending operation being the third scheduling mode, and the configuration mode of the flexible time domain symbol being a sixth configuration mode, abandon the sidelink sending operation;
wherein, the third scheduling mode indicates that the sidelink sending operation is a sidelink transmission operation scheduled by sidelink control information sent by other user equipments other than the user equipment;
the fifth configuration mode indicates that the flexible time domain symbol is configured by the user equipment according to a pre-configured slot format when a configuration is not received from the base station; or, the third configuration mode indicates that the flexible time domain symbol is configured by the user equipment by default when a configuration is not received from the base station and there is no pre-configuration;
the sixth configuration mode indicates that the flexible time domain symbol is configured by the base station through a semi-static signaling, and the base station does not dynamically indicate the flexible time domain symbol through a DCI signaling; or, the sixth configuration mode indicates that the flexible time domain symbol is configured by the base station through a user-specific semi-static signaling, and the base station does not dynamically indicate the flexible time domain symbol through the DCI signaling; or, the sixth configuration mode indicates that the flexible time domain symbol is configured by the base station through the semi-static signaling, and is dynamically indicated by the base station through the DCI signaling; or, the sixth configuration mode indicates that the flexible time domain symbol is configured by the user equipment according to a pre-configured slot format when a configuration is not received from the base station, and is indicated by other user equipments through sidelink control information or sidelink broadcast information.

18. The apparatus of claim 11, wherein the processor is configured to:
in response to the sidelink operation being a sidelink receiving operation and there being no uplink/downlink operation, perform the sidelink receiving operation.

* * * * *